(12) United States Patent
Brockway

(10) Patent No.: US 8,696,239 B2
(45) Date of Patent: Apr. 15, 2014

(54) FULL METAL JACKET COMPACTION WHEEL CLEAT AND METHOD OF MANUFACTURING THEREOF

(75) Inventor: Robert John Brockway, Scottsboro, AL (US)

(73) Assignee: Terra Compactor Wheel Corp., Plymouth, WI (US)

( * ) Notice: Subject to any disclaimer, the term of this patent is extended or adjusted under 35 U.S.C. 154(b) by 54 days.

(21) Appl. No.: 13/216,410

(22) Filed: Aug. 24, 2011

(65) Prior Publication Data

US 2013/0051915 A1    Feb. 28, 2013

(51) Int. Cl.
*E01C 19/26*    (2006.01)

(52) U.S. Cl.
USPC .............................. 404/124; 404/121; 301/43

(58) Field of Classification Search
USPC .......... 404/121, 124, 128; 301/43, 44.1–44.4; 37/452, 453, 455
See application file for complete search history.

(56) References Cited

U.S. PATENT DOCUMENTS

| | | | |
|---|---|---|---|
| 2,131,947 A * | 10/1938 | Gilmore | 404/121 |
| 2,312,471 A * | 3/1943 | Low | 404/121 |
| 4,530,620 A | 7/1985 | McCartney | |
| 4,668,122 A | 5/1987 | Riddle | |
| 4,913,581 A | 4/1990 | Weiler | |
| 4,950,102 A * | 8/1990 | Zeitz | 404/121 |
| 5,217,321 A | 6/1993 | Corcoran et al. | |
| 5,687,799 A | 11/1997 | Greenfield et al. | |
| 5,967,242 A | 10/1999 | Caron et al. | |
| 6,039,405 A * | 3/2000 | Kurata et al. | 301/43 |
| 6,632,045 B1 | 10/2003 | McCartney | |
| 6,712,551 B2 | 3/2004 | Livesay et al. | |
| 6,837,649 B2 | 1/2005 | Livesay et al. | |
| 7,112,006 B2 * | 9/2006 | Moyna | 404/124 |
| 7,198,333 B1 | 4/2007 | Freeman | |
| D617,817 S * | 6/2010 | Brockway | D15/28 |
| 2004/0033107 A1 * | 2/2004 | Caron et al. | 404/124 |
| 2010/0247242 A1 | 9/2010 | Gibbins | |
| 2011/0116866 A1 * | 5/2011 | Brockway | 404/121 |

* cited by examiner

*Primary Examiner* — Matthew D Troutman
(74) *Attorney, Agent, or Firm* — Ziolkowski Patent Solutions Group, SC

(57) ABSTRACT

A two-piece construction compaction cleat and method of manufacturing thereof is disclosed. The compactor includes a base member affixable to a compactor wheel and having a bottom portion and a center flange, with the center flange extending upwardly from the bottom portion to form an upper ridge and being generally aligned along a center line of the base member. The compactor cleat also includes a cap member secured to the base member and positioned thereover so as to cover at least a portion of the base member, with the cap member having an arrangement of openings configured to receive the center flange therein. The center flange of the base member and the arrangement of openings formed in the cap member are configured to provide for a size-on-size fit between the base member and the cap member, so as to secure the cap member to the base member.

9 Claims, 7 Drawing Sheets

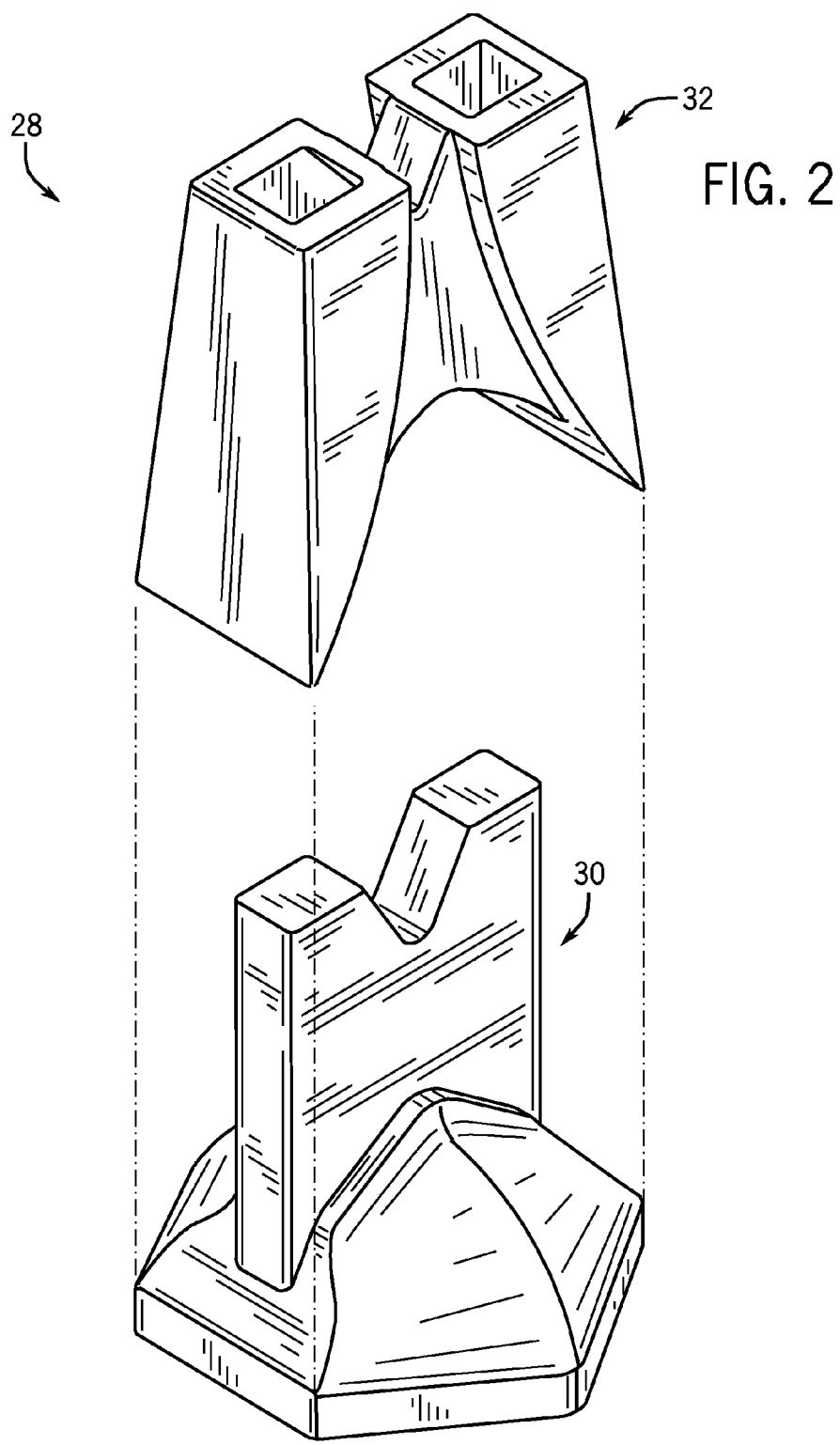

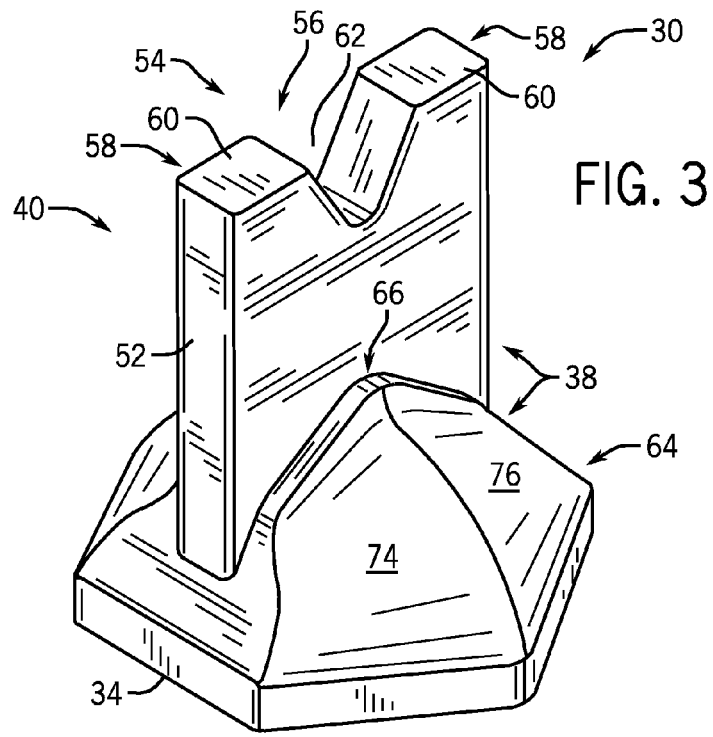
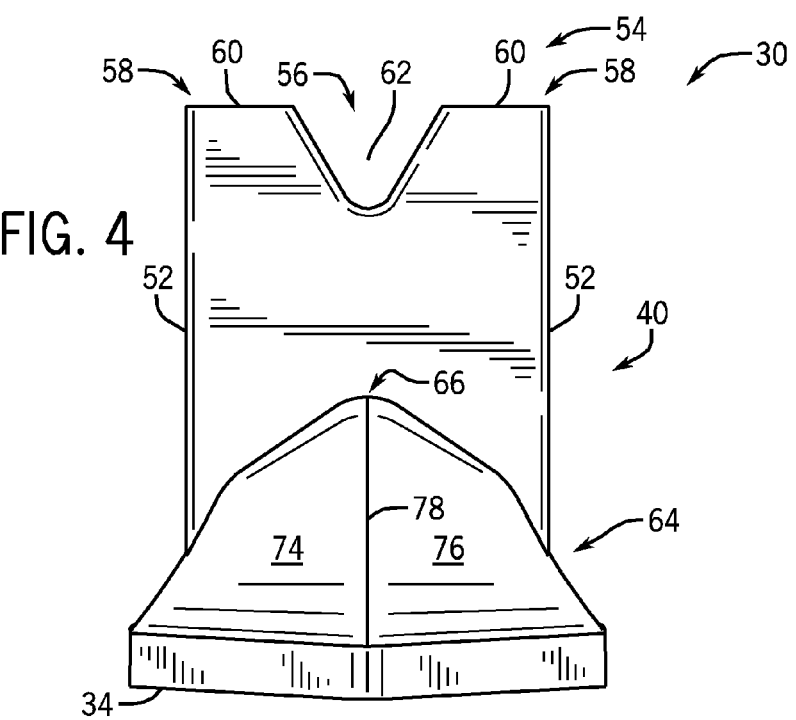

FULL METAL JACKET COMPACTION WHEEL CLEAT AND METHOD OF MANUFACTURING THEREOF

BACKGROUND OF THE INVENTION

The invention relates generally to compaction machines, such as those used to compact landfills and, more particularly, to a compactor wheel on such a compaction machine including a plurality of cleats thereon, with the cleats having a two-piece construction that includes a base and a replaceable cap.

Compaction machines are used to compact landfill sites, garbage dumps and other such locations. These machines typically include a self-propelled vehicle having four large compactor wheels made of steel. Each compactor wheel has a hub mounted to one end of an axle and a rim disposed around and radially out from the hub. The rim typically includes an outer wrapper on which a plurality of cleats or teeth is usually mounted. The design of conventional compactor wheels, and in particular the compactor wheel cleats, varies widely. In general, the cleats are designed to compress (i.e., compact) the waste by concentrating the weight of the compaction machine on the relatively small area of the cleats. The cleats also function to break apart waste by imparting breaking forces thereon.

Over time, compactor wheel cleats wear down and become less efficient in compressing and breaking apart waste. Thus, some compactor wheel cleats have a two-part design that includes a base and a replaceable cap. The base is typically welded to the outer wrapper of the rim, and thus a metallurgical composition of the base is such as to facilitate welding to the outer wrapper. Desirably, the metallurgical composition of the replaceable cap is different from the base, with the replaceable cap being formed of a substantially harder material (e.g., steel) that resists abrasion and prolongs the life of the cap.

It is recognized, that the material(s) from which the replaceable cap is formed is not conducive to welding and, for this reason, a mechanical connection is often implemented to affix the replaceable cap to the base. For example, a pin and coil spring member connection or a bolt and clip connection might be implemented to affix the replaceable cap to the base. However, there are drawbacks associated with the use of mechanical connections to secure the replaceable cap to the base, including: cost, longevity of the mechanical connection (which may be less than the life of the replaceable cap), and the ease of adding/removing the mechanical connection to and from the replaceable cap when replacing the cap.

It would therefore be desirable to have a system and method for providing a compactor wheel cleat that allows for efficient adding and removal of a cleat cap to a cleat base when replacement is required. It would further be desirable for such a cleat to exhibit increased longevity and low cost.

BRIEF DESCRIPTION OF THE INVENTION

Embodiments of the invention provide a compactor wheel and compaction cleat mounted thereon, the compaction cleat configured to provide for efficient addition and removal of a cleat cap to a cleat base when replacement is required.

In accordance with one aspect of the invention, a compactor cleat mountable on a compactor wheel, the compactor cleat including a base member affixable to a compactor wheel and comprising a bottom portion and a center flange, with the center flange extending upwardly from the bottom portion to form an upper ridge and being generally aligned along a center line of the base. The compactor cleat also includes a cap member secured to the base member and positioned thereover so as to cover at least a portion of the base member, with the cap member comprising an arrangement of openings therein configured to receive the center flange of the base member therein. The center flange of the base member and the arrangement of openings formed in the cap member are configured to provide for a size-on-size fit between the base member and the cap member, so as to secure the cap member to the base member.

In accordance with another aspect of the invention, a method for assembling a compactor cleat includes providing a base member affixable to a compactor wheel, the base member having a bottom portion and a center protrusion extending upwardly from the bottom portion, and providing a cap member configured to mate with the base member so as to cover at least a portion of the base member, the cap member having a semi-hollow member configured to receive the center protrusion therein. The method also includes performing at least one of a cap member heating operation and a base member cooling operation so as to alter the dimensions of at least one of the semi-hollow cap member and the center protrusion of the base member and positioning the center protrusion within the semi-hollow member while the dimensions of the at least one of the semi-hollow cap member and the center protrusion of the base member are altered. The center protrusion of the base member forms an interference fit with the semi-hollow cap member upon a return of the at least one of the cap member and the base member to ambient temperature.

In accordance with yet another aspect of the invention, a method for affixing a compactor tooth to a compactor wheel includes welding a base member of the compactor tooth to a rim of the compactor wheel, the base member having a bottom portion configured to mate with the rim of the compactor wheel and a base protrusion extending upwardly from the bottom portion. The method also includes providing a cap member configured to mate with the base member and having an arrangement of receptacles formed therein configured to receive the base protrusion therein, modifying a temperature of at least one of the base member and the cap member from an ambient temperature so as to alter the dimensions of at least one of the base protrusion and the receptacles formed in the cap member, and positioning the base protrusion within the receptacles formed in the cap member while the dimensions of the at least one of the base protrusion and the receptacles formed in the cap member are in an altered state. The base protrusion and the arrangement of receptacles formed in the cap member are configured to provide for a size-on-size fit between the base member and the cap member, upon a return of the base member and the cap member to the ambient temperature.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIG. 2 is an exploded perspective view of a compactor wheel cleat according to an embodiment of the invention.

FIGS. 3-6 are views of a compactor wheel cleat base member according to an embodiment of the invention.

DETAILED DESCRIPTION OF THE PREFERRED EMBODIMENTS

Figure 1:
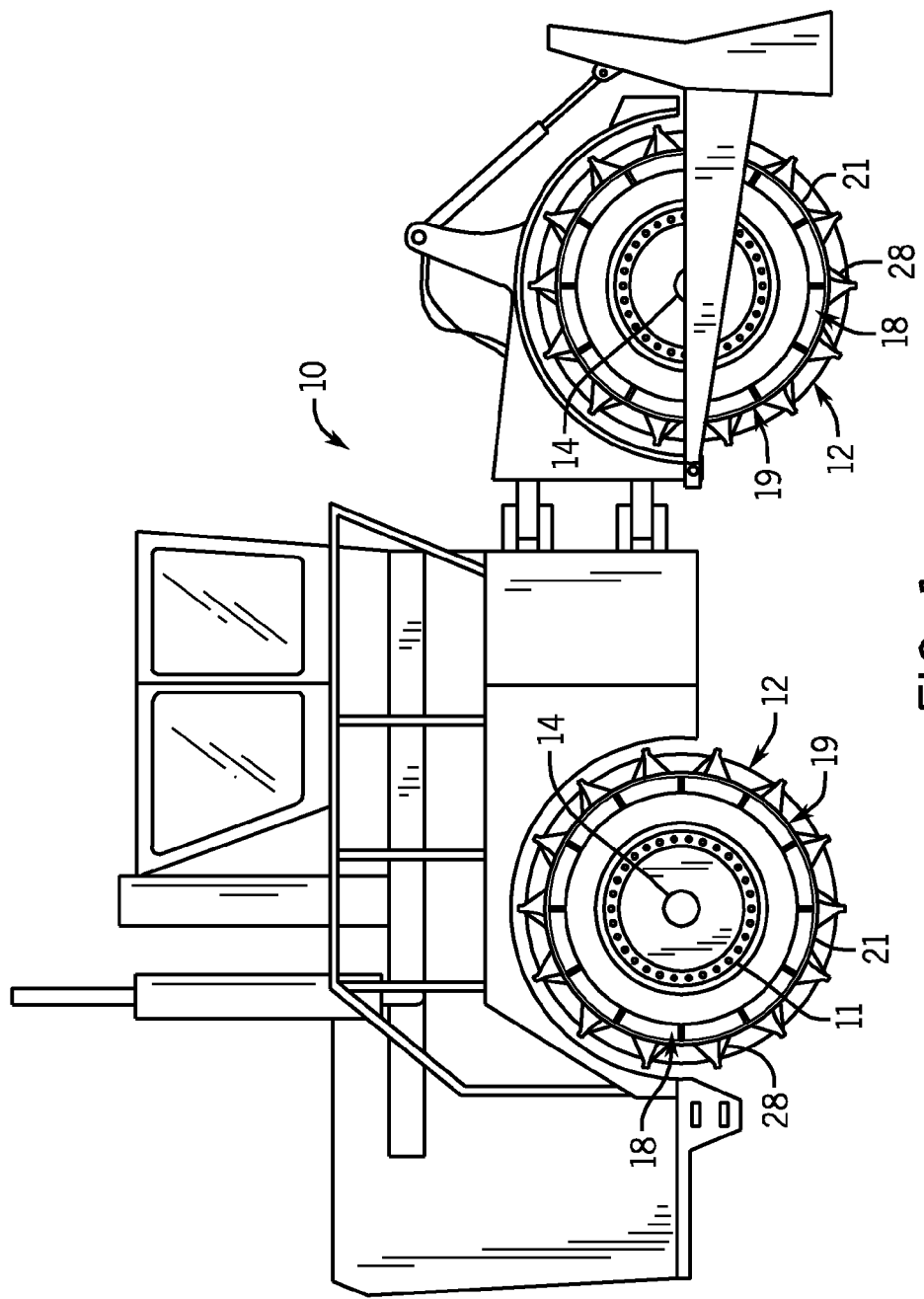
FIG. 1 is a side view of a compaction machine having compactor wheels mounted thereon for use with embodiments of the invention.
Figure 5:
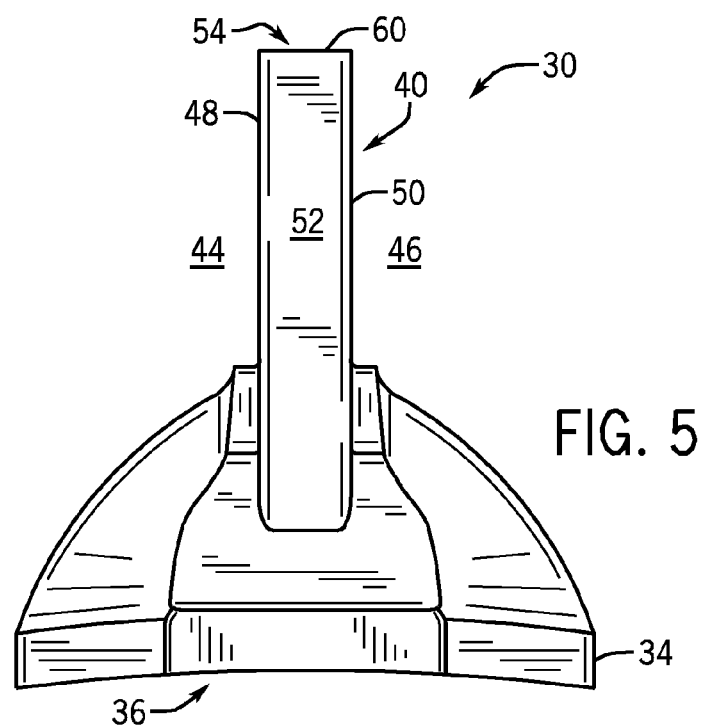
Figure 6:
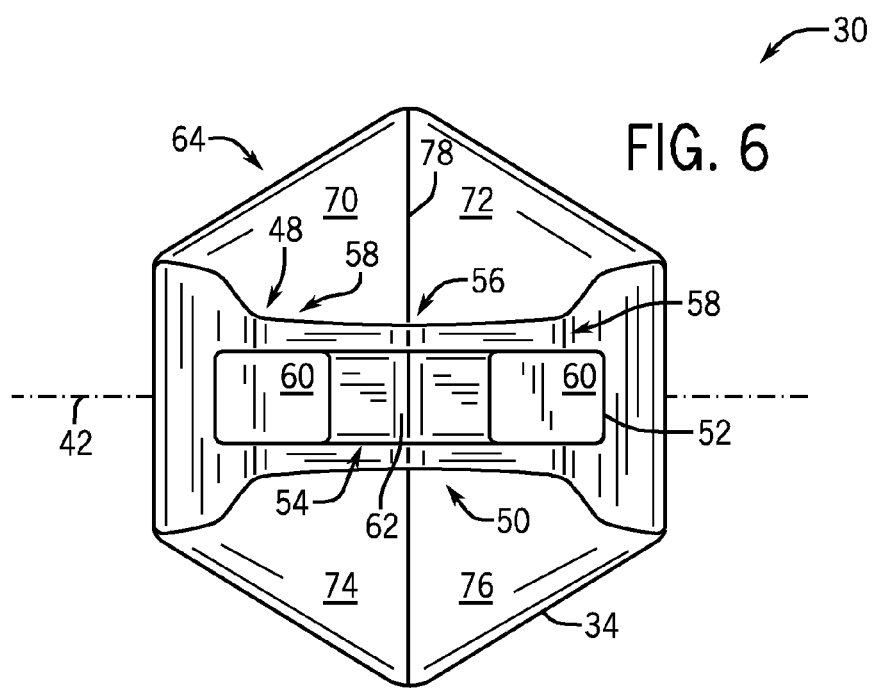
Figure 7:
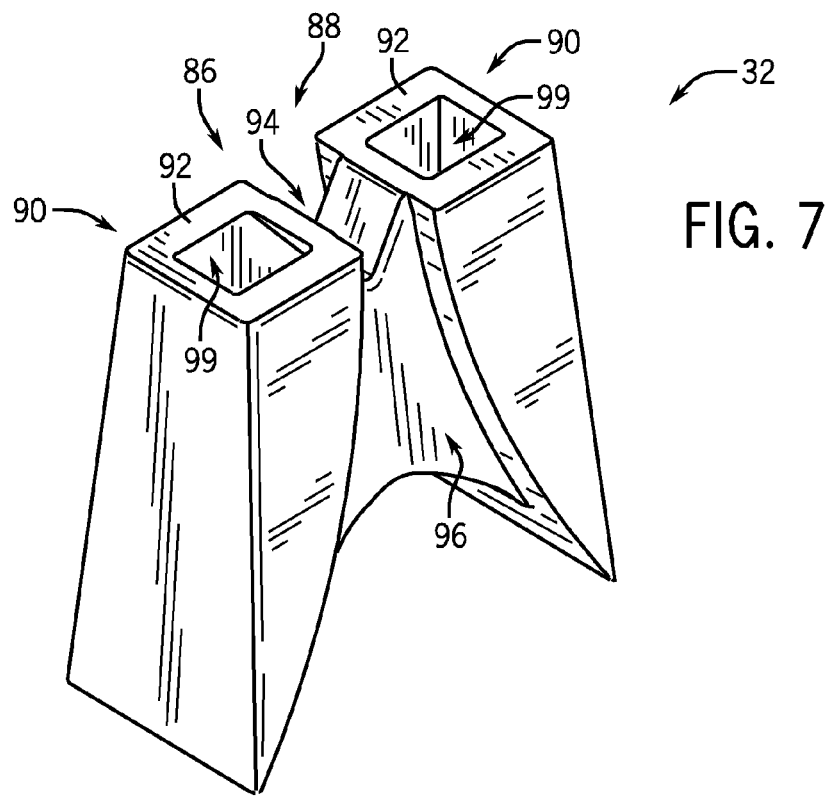
FIGS. 7-11 are views of a compactor wheel cleat cap member according to an embodiment of the invention.
Figure 8:
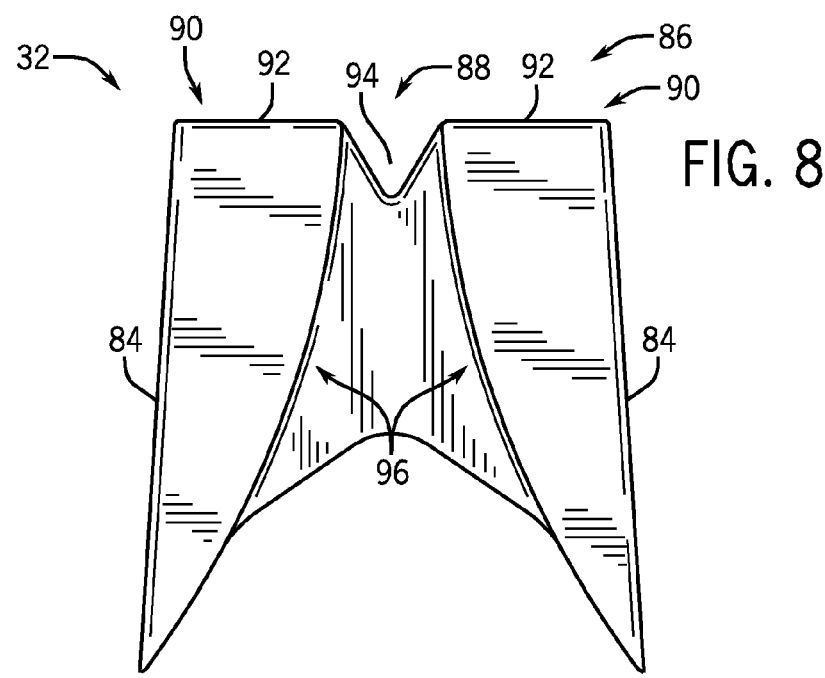
Figure 9:
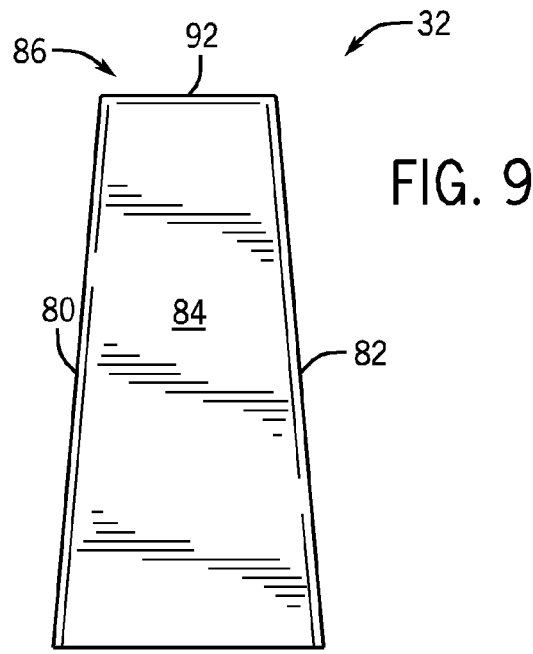
Figure 10:
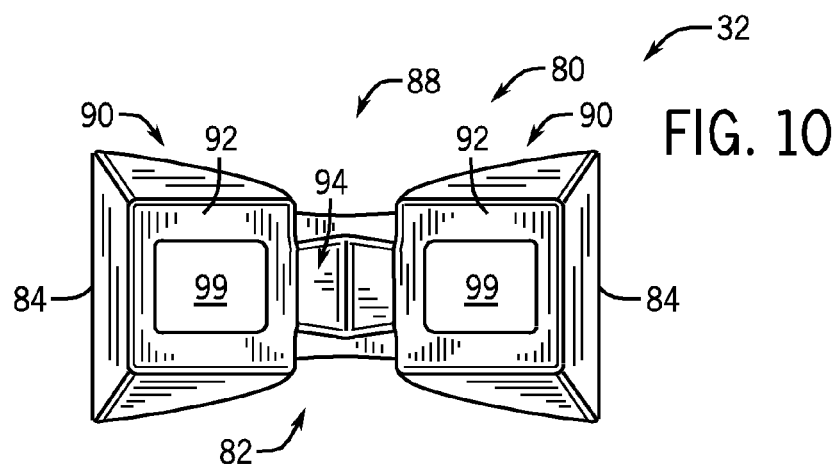

Referring to FIG. 1, a compaction machine 10 is shown and includes compactor wheels 12 mounted on the axles 14 of the compaction machine 10. The present invention is not intended to be limited to any particular type of compaction machine 10 and may be used on any suitable compaction machine. The wheels 12 include a hub 11 adapted, for example, with a plurality of bolt holes for being bolted or otherwise mounted to the axle 14. A rim 18 is mounted around the hub 11. The rim 18 includes a wrapper 19 with an outer face or surface 21 on which a plurality of cleats or teeth 28 are mounted, such as by welding or any other suitable technique. The cleats 28 can be mounted in any of a variety of patterns, as desired, such as being aligned in a plurality of rows, for example.

Referring to FIG. 2, the construction of a cleat/tooth 28 is shown according to an embodiment of the invention. Cleat 28 is formed having a generally two-part construction, with a base member 30 (i.e., base) securable to wrapper 19 (FIG. 1) and a cap member 32 (i.e., cap) extending radially outward from the base 30. Base 30 may be formed of a first material conducive for welding to wrapper 19, such as a mild carbon A136 steel or 4140 high carbon steel, for example, that can be hammer forged to a desired shape. Cap 32 may be formed of a second material having optimal abrasion/wear resistance properties, such as high chromium 532A steel, for example, that can be casted into a desired shape and secured onto base 30, as will be explained in greater detail below.

According to embodiments of the invention, and as explained in greater detail below, base 30 and cap 32 are sized and constructed so as to provide for a size-on-size fitting (i.e., interference fit) between the base 30 and the cap 32. That is, base 30 and cap 32 are secured/fastened together by way of friction created therebetween when the cap 32 is pushed onto the base 30. Accordingly, mating features of base 30 are formed to have slightly larger dimensions (i.e., circumferential dimensions) than mating features of cap 32. The exact dimensions of such mating features of base 30 and cap 32 can be selected based on the amount of "interference" or "allowance" that is desired between the base 30 and the cap 32, and known formulas or tables for computing the interference can be implemented based on the material being used, how big the base/cap are, and what degree of tightness or friction is desired.

Referring now to FIGS. 3-6, the base 30 is shown in greater detail from various views and as being formed to have a generally hexagonal shape that is adapted for welding to wrapper 19 (FIG. 1) in a conventional way. The base 30 includes a generally hexagonal shaped bottom portion 34 having a curved profile 36 to accommodate welding of the base 30 to the wrapper 19. The base 30 also includes an arrangement of protrusions 38 that extend radially outward from the bottom portion 34 of base 30 and away from wrapper 19 of wheel 12 (FIG. 1). The arrangement of protrusions 38 includes a flange-like center protrusion 40 (i.e., center flange) extending upward from the base 30 and along a centerline 42 thereof, thereby generally dividing the base 30 into an equal first region 44 and a second region 46. The center protrusion 40 includes a front surface 48, a back surface 50, and two side surfaces 52, with each of the surfaces extending from a bottom of base 30 up to an upper ridge 54 (i.e., crest) of the base 30. Each of front surface 48, back surface 50, and side surfaces 52 are formed at so as to be oriented perpendicular to hexagonal shaped bottom portion 34. That is, center protrusion 40 is constructed such that the planes of front surface 48 and back surface 50 are parallel to one another and the planes of side surfaces 52 are also parallel to one another. Accordingly, front surface 48, back surface 50, and side surfaces 52 are formed/oriented such that a thickness of center protrusion 40 is consistent along a length thereof and does not vary (i.e., center protrusion 40 is not tapered).

As shown in FIGS. 3-6, center protrusion/flange 40 is generally divided into three portions. A center portion 56 is positioned in a center area of a lengthwise dimension of center protrusion 40, with a side portion 58 positioned on each end of center protrusion 40 and on either side of center portion 72. Each of the side portions 58 has a top surface 60 that forms part of upper ridge 54 and that is generally parallel to bottom portion 34 of base 30, in the form of a planar surface. Center portion 56 of center protrusion 40 is positioned between side portions 58 and is configured so as to interrupt the planar surface of upper ridge 54 formed by top surface 60 of side portions 58. More particularly, center portion 56 is configured as a V-shaped notch 62 extending downward from the planar top surface 60 of the side portions 58. Thus, upper ridge 54 has a profile formed of planar surfaces 60 on side portions 58 with a V-shaped notch 62 positioned therebetween on center portion 56.

Also included in the arrangement of protrusions 38 on base 30 is a pyramidal protrusion 64 extending upward from the bottom portion 34 of base 30 and having a point 66 generally aligned with the notch 62 formed in the center portion 56 of the center protrusion 40. Pyramidal protrusion 64 extends upward from the bottom portion 34 of base 30 and partially up center protrusion 40, such that point 66 of the pyramidal protrusion 64 is positioned below notch 62 of center portion 56. The pyramidal protrusion 64 is formed on base 30 so as to be bisected by the center protrusion 40, such that a first portion of the pyramidal protrusion 64 extends outwardly from front surface 48 of the center protrusion 40 and a second portion of the pyramidal protrusion 64 extends outwardly from back surface 50 of the center protrusion 40. Each of the first and second portions of pyramidal protrusion 64 include thereon a pair of sloped surfaces, with the sloped surfaces of the first portion being identified as first and second sloped surfaces 70, 72 and the sloped surfaces of the second portion being identified as third and fourth sloped surfaces 74, 76. An edge 78 is formed on first portion dividing the first and second sloped surfaces 70, 72, and an edge 78 is similarly formed on second portion dividing the third and fourth sloped surfaces 74, 76.

Referring now to FIGS. 7-11, cap member 32 is shown in greater detail. The cap 32 is constructed to mate with base 30 and be positioned thereover. The shape of cap 32 roughly follows/mirrors that of center protrusion 40 of base 30. Cap 32 includes a front surface 80, a back surface 82, and two side surfaces 84, along with a top cap surface 86. Each of front surface 80, back surface 82, and side surfaces 84 are formed at an angle so as to slope upwardly and inwardly from base 30 to upper ridge 86 of cap 32.

As shown in FIGS. 7-11, cap 32 is generally divided into three portions. The portions of cap 32 generally correspond to the portions of center protrusion 40 (i.e., center portion 56 and side portions 58), and thus cap 32 includes a center cap portion 88 and side cap portions 90 positioned on either side of center cap portion 88. Each of the side cap portions 90 includes a top surface 92 that forms part of top cap surface 86, with the top surface(s) 92 being flat, planar surfaces. Center cap portion 88 is positioned between side cap portions 90 and is configured so as to interrupt the top cap surface 86. More particularly, center cap portion 88 is configured as a V-shaped notch 94 extending downward from the planar top surface 92 of the side cap portions 90. Thus, top cap surface 86 has a profile formed of planar surfaces 92 on side cap portions 90 with a V-shaped notch 94 positioned therebetween on center cap portion 88. As shown in FIGS. 7-11, center cap portion 88 is further formed to have a decreased thickness as compared to side cap portions 90, such that center cap portion 88 functions to cut or break apart waste/debris forced thereon. As shown in FIGS. 7-11, front and back surfaces 80, 82 of center cap portion 88 of cap 32 have channels or curvature features 96 formed therein extending downward from notch 94 and flaring outward in opposing directions to either side of pyramidal protrusion 64 of base 30 (FIG. 3). The center cap portion 88 of cap 32 ends at the pyramidal protrusion 64 of base 30.

Figure 11:
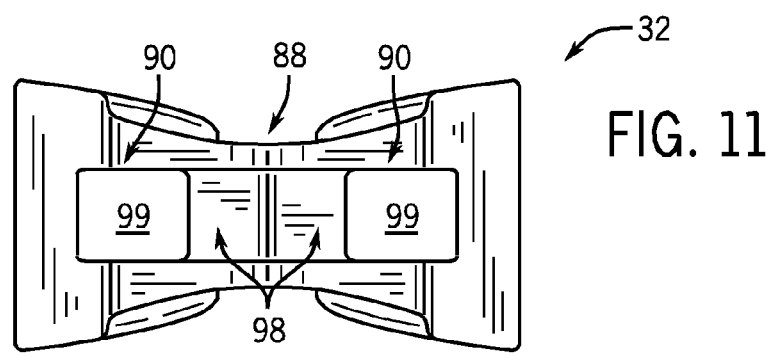

As shown in FIG. 11, cap 32 is constructed so as to have a semi-hollow configuration that enables mating of cap 32 with base 30. An arrangement of openings or receptacles 98, 99 is thus formed in the center cap portion 88 and side cap portions 90 of cap 32, with the arrangement of openings/receptacles 98, 99 being configured to receive portions of base 30 therein. More specifically, the opening 98 of center cap portion 88 and the openings 99 of side cap portions 90 are configured to mate with the center portion 56 and side portions 58 of center protrusion 40 of base 30 (see FIGS. 3-6), respectively. The openings/receptacles 99 formed in side cap portions 90 extend through the cap 32, such that window-frame type openings are formed in the top cap surface 86 of cap 32.

According to embodiments of the invention, center portion 56 and side portions 58 of center protrusion 40 of base 30, and openings 98, 99 of center cap portion 88 and side cap portions 90, are sized and constructed so as to provide for a size-on-size fitting (i.e., interference fit) between the base 30 and the cap 32. That is, base 30 and cap 32 are secured/fastened together by way of friction between the base 30 and the cap 32, upon placement of the center portion 56 and side portions 58 of center protrusion 40 of base 30 within the openings 98, 99 of center cap portion 88 and side cap portions 90 of cap 32. Accordingly, the center portion 88 and side portions 90 of center protrusion 40 of base 30 are formed to have slightly larger dimensions (i.e., circumferential dimensions) than the openings 98, 99 of center cap portion 88 and side cap portions 90 that receive the center protrusion 40. The exact circumferential dimensions of the center protrusion 40 and openings 98, 99 can be selected based on the amount of "interference" or "allowance" that is desired between base 30 and cap 32, and known formulas or tables for computing the interference can be implemented based on the material being used, how big the base/cap are, and what degree of tightness or friction is desired.

Referring back now to the exploded perspective view of cleat 28 of FIG. 2, and with continued reference to FIG. 11, constructing of the cleat 28 by joining of the base 30 to the cap 32 is set forth here below, according to embodiments of the invention. As indicated above, base 30 and cap 32 are sized and constructed so as to provide for a size-on-size fitting (i.e., interference fit) between the base and the cap. That is, base 30 and cap 32 are secured/fastened together by way of friction between the components, with the base 30 and/or the cap 32 being oversized or undersized, respectively, to provide for "interference" between the base 30 and cap 32. The base 30 is thus constructed such that center protrusion 40 has circumferential dimensions that are slightly larger than the circumferential dimensions of openings/receptacle 98, 99 formed in cap 32.

According to embodiments of the invention, the size-on-size fit between base 30 and cap 32 is accomplished by a construction technique that utilizes thermal expansion or contraction. That is, it is recognized that most materials expand when heated and shrink when cooled, and thus heating or cooling of components can be implemented in order to temporarily shrink/expand a component so as to provide for placement of components relative to one another. Thus, the thermal expansion or contraction of cap 32 and/or base 30 of cleat 28 allows for the cap to be pushed down onto base, as indicated by the dashed lines in FIG. 2, with the cap 32 being secured to the base 30 by way of the size-on-size fit once the base and/or cap are returned to a thermal equilibrium.

According to one embodiment of the invention, a technique for assembling cleat 28 is provided where cap 32 is heated in order to expand the dimensions of the cap and enlarge openings 98, 99, so as to accommodate receipt of the center protrusion 40 of base 30 therein. The cap 32 is heated, such as by way of a torch or gas oven for example, and pushed down onto base 30 while hot. The cap 32 is then allowed to cool and contract back to its former size, except for the compression that results from the cap 32 interfering with the base 30. That is, the openings 98, 99 formed in the center cap portion 88 and side cap portions 90 of cap 32 will not return to their prior/original dimensions, based on the oversize center protrusion 40 of base 30 positioned therein.

According to another embodiment of the invention, a technique for assembling cleat 28 is provided where base 30 is cooled in order to shrink the dimensions of the base, so as to accommodate positioning of the center protrusion 40 of base 30 into openings 98, 99 of cap 32. The base 30 is cooled, such as by way of a liquid hydrogen bath for example, such that it slides easily into position within openings 98, 99 of cap 32 while cooled. The base 30 is then allowed to warm and expand back to its former size, except for the compression that results from the cap 32 interfering with the base 30. That is, the center portion 56 and side portions 58 of center protrusion 40 will not return to their prior/original dimensions, based on the undersized openings 98, 99 of cap 32 that are positioned thereabout.

Figure 12:
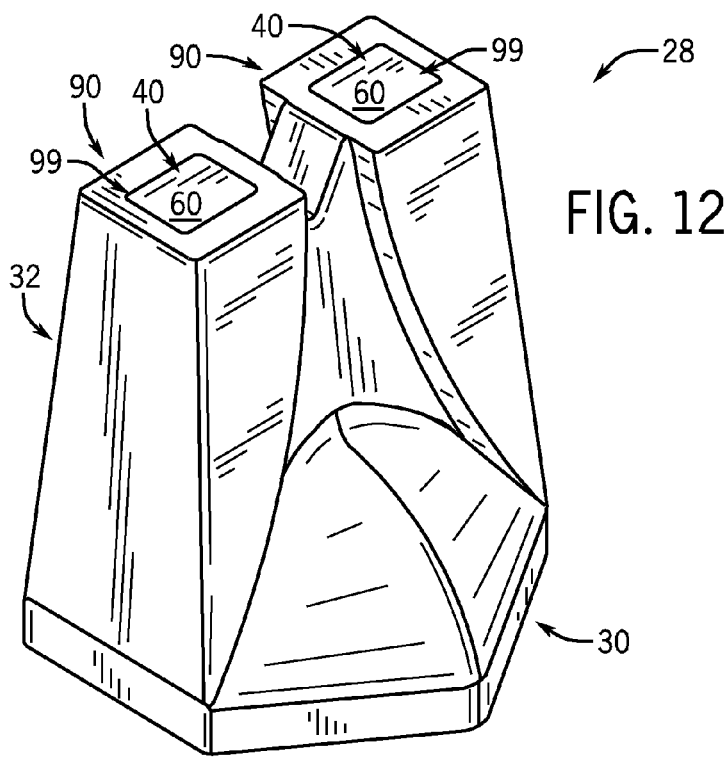
FIGS. 12 and 13 are views of the assembled compactor wheel cleat according to an embodiment of the invention.
Figure 13:
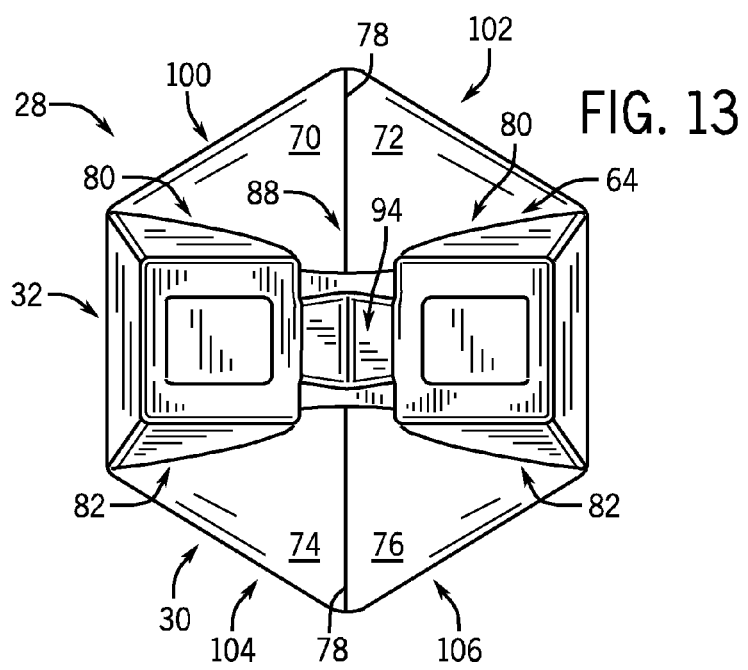

Referring now to FIGS. 12 and 13, views of the assembled cleat 28 are provided, with the base 30 and cap 32 secured together by way of the size-on-size fit formed therebetween. As shown in FIG. 12, according to an embodiment of the invention, the center protrusion 40 of base 30 is formed such that the planar surfaces 60 on side portions 58 of upper ridge 54 form a portion of a top surface of cleat 28 when the cap 32 is positioned on base 30. That is, side portions 58 of center protrusion 40 of extend all the way through openings 99 of side cap portions 90, so as to form a flush surface with the side cap portions 90, and form part of an upper surface of cleat 28. Desirably, the formation of center protrusion 40 of base 30 to extend up through cap 32 to a top or upper surface of cleat 28 reduces the amount of material needed to form the cap 32 and, accordingly, reduces the material costs associated with replacement of the cap 32.

As further shown in FIGS. 12 and 13, when cleat is assembled and pyramidal protrusion 64 of base 30 is oriented relative to cap 32 such that edges 78 are aligned with notch 94 of cap 32, the sloped surfaces 70, 72, 74, 76 on pyramidal protrusion 64 are angled in opposing directions from notch 94. Accordingly, the cleat 28 is divided into four quadrants angled in differing directions, with a first quadrant 100, a second quadrant 102, a third quadrant 104, and a fourth quadrant 106 being formed. The first sloped surface 70 of the pyramidal protrusion 64 and the front surface 80 of the cap 32 thus define the first quadrant 100, with the second sloped surface 72 of the pyramidal protrusion 64 and the front surface 80 of the cap 32 defining the second quadrant 102, the third sloped surface 74 of the pyramidal protrusion 64 and the back surface 82 of the cap 32 defining the third quadrant 104, and the fourth sloped surface 76 of the pyramidal protrusion 64 and the back surface 82 of the cap 32 defining the fourth quadrant 106.

As shown in FIGS. 12 and 13, each of the four cleat quadrants 100, 102, 104, 106 are angled away from other respective quadrants of the cleat 28 such that waste/debris forced onto cleat 28 is pushed in four distinct directions corresponding to the four protrusion quadrants. In operation, waste is pressed onto cleat 28 during rotation of compactor wheel 12 and is generally directed toward notch 94 formed in center portion 88 of cap 32. Waste is then forced into four separate directions (i.e., into quadrants 100, 102, 104, 106) by way of cap 32 and pyramidal protrusion 64 of base 30, thus breaking apart waste as it is pressed onto cleat 28. As such, the amount of waste or debris that builds up on cap 32 of cleat 28 is minimized and the compactor wheel 12 is kept cleaner.

Beneficially, according to embodiments of the invention, the size-on-size fitting between base 30 and cap 32 provides a secure connection between the base 30 and cap 32 without the need for a mechanical connection therebetween, such as a pin or bolt type structure. Furthermore, no tapering of the base 30 and/or cap 32 is needed for mating the components together. However, it is recognized that embodiments of the invention could also include configurations where center protrusion 40 of base 30 is in the form of a tapered member, and such tapered structures are considered to be within the scope of the invention. In such an embodiment, an adhesive could be provided on center protrusion 40 to secure the base 30 to cap 32 when the center protrusion 40 is positioned within the receptacles 98, 99 of the cap 32.

Therefore, according to one embodiment of the invention, a compactor cleat mountable on a compactor wheel, the compactor cleat including a base member affixable to a compactor wheel and comprising a bottom portion and a center flange, with the center flange extending upwardly from the bottom portion to form an upper ridge and being generally aligned along a center line of the base. The compactor cleat also includes a cap member secured to the base member and positioned thereover so as to cover at least a portion of the base member, with the cap member comprising an arrangement of openings therein configured to receive the center flange of the base member therein. The center flange of the base member and the arrangement of openings formed in the cap member are configured to provide for a size-on-size fit between the base member and the cap member, so as to secure the cap member to the base member.

According to another embodiment of the invention, a method for assembling a compactor cleat includes providing a base member affixable to a compactor wheel, the base member having a bottom portion and a center protrusion extending upwardly from the bottom portion, and providing a cap member configured to mate with the base member so as to cover at least a portion of the base member, the cap member having a semi-hollow member configured to receive the center protrusion therein. The method also includes performing at least one of a cap member heating operation and a base member cooling operation so as to alter the dimensions of at least one of the semi-hollow cap member and the center protrusion of the base member and positioning the center protrusion within the semi-hollow member while the dimensions of the at least one of the semi-hollow cap member and the center protrusion of the base member are altered. The center protrusion of the base member forms an interference fit with the semi-hollow cap member upon a return of the at least one of the cap member and the base member to ambient temperature.

According to yet another embodiment of the invention, a method for affixing a compactor tooth to a compactor wheel includes welding a base member of the compactor tooth to a rim of the compactor wheel, the base member having a bottom portion configured to mate with the rim of the compactor wheel and a base protrusion extending upwardly from the bottom portion. The method also includes providing a cap member configured to mate with the base member and having an arrangement of receptacles formed therein configured to receive the base protrusion therein, modifying a temperature of at least one of the base member and the cap member from an ambient temperature so as to alter the dimensions of at least one of the base protrusion and the receptacles formed in the cap member, and positioning the base protrusion within the receptacles formed in the cap member while the dimensions of the at least one of the base protrusion and the receptacles formed in the cap member are in an altered state. The base protrusion and the arrangement of receptacles formed in the cap member are configured to provide for a size-on-size fit between the base member and the cap member, upon a return of the base member and the cap member to the ambient temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compactor cleat mountable on a compactor wheel, the compactor cleat comprising:
    a base member affixable to a compactor wheel and comprising a bottom portion and a center flange, the center flange comprising a non-tapered flange extending upwardly from the bottom portion to form an upper ridge and being generally aligned along a center line of the base member; and
    a cap member secured to the base member and positioned thereover so as to cover at least a portion of the base member, the cap member comprising a semi-hollow member having one or more openings formed therein configured to receive the center flange of the base member therein;
    wherein the non-tapered center flange of the base member is constructed to have circumferential dimensions larger than circumferential dimensions of respective openings formed in the semi-hollow cap member that receive the non-tapered center flange therein, such that an interference is formed between the base member and the cap member upon positioning of the cap member onto the base member, so as to secure the cap member to the base member;
    wherein the center flange of the base member further comprises:

a pair of side portions positioned on opposing ends of the center flange, each of the pair of side portions having a planar top surface forming part of the upper ridge; and a center portion located between the side portions and including a top surface forming part of the upper ridge, the top surface of the center portion comprising a V-shaped notch that extends downward from the planar top surface of the side portions; and wherein the cap member is configured to have a shape substantially similar to the center flange of the base member, the cap member further comprising:

a pair of side cap portions each having a planar top surface forming part of an upper cap ridge, each of the pair of side cap portions including an opening formed therein configured to receive the side portions of the center flange; and a center cap portion located between the side cap portions, the center cap portion including a V-shaped notch formed therein and including an opening formed therein configured to receive the center portion of the center flange.

2. The compactor cleat of claim 1 wherein the center flange includes a front surface, a back surface, and side surfaces extending between the base and the upper ridge.

3. The compactor cleat of claim 2 wherein the front surface and the back surface of the center flange are parallel to one another and the side surfaces of the center flange are parallel to one another, such that the center flange comprises a non-tapered protrusion.

4. The compactor cleat of claim 1 wherein the pair of side portions of the center flange extend up through the openings formed in the pair of side cap portions so as to form a part of an upper surface of the compactor cleat.

5. The compactor cleat of claim 1 wherein the cap member is configured to be pushed onto the base member upon one of a heating-induced expansion of the dimensions of the openings in the cap member and a cooling-induced contraction of the dimensions of the center flange of the base member, so as to secure the cap member to the base member by way of friction therebetween.

6. The compactor cleat of claim 1 wherein the base member is formed of a first material and the cap member is formed of a second material different from the first material, the first material comprising a weldable metal and the second material comprising an abrasion resistant metal.

7. A compactor cleat comprising:

a base member affixable to a compactor wheel and comprising a bottom portion and a center flange, the center flange comprising:

a pair of side portions positioned on opposing ends of the center flange, each of the pair of side portions having a planar top surface forming part of an upper ridge of the center flange; and a center portion located between the side portions and including a top surface forming part of the upper ridge, the top surface of the center portion comprising a V-shaped notch that extends downward from the planar top surface of the side portions; and a cap member secured to the base member and positioned thereover so as to cover at least a portion of the base member, the cap member comprising:

a pair of side cap portions each having a planar top surface forming part of an upper cap ridge, each of the pair of side cap portions including an opening formed therein configured to receive the side portions of the center flange; and a center cap portion located between the side cap portions, the center cap portion including a V-shaped notch formed therein and including an opening formed therein configured to receive the center portion of the center flange;

wherein the pair of side portions of the center flange extend up through the openings formed in the pair of side cap portions so as to form a part of an upper surface of the compactor cleat.

8. A compactor cleat mountable on a compactor wheel, the compactor cleat comprising:

a base member affixable to a compactor wheel and comprising a bottom portion and a center flange, the center flange comprising a non-tapered flange extending upwardly from the bottom portion to form an upper ridge and being generally aligned along a center line of the base member; and a cap member secured to the base member and positioned thereover so as to cover at least a portion of the base member, the cap member comprising a semi-hollow member having one or more openings formed therein configured to receive the center flange of the base member therein;

wherein the non-tapered center flange of the base member is constructed to have circumferential dimensions larger than circumferential dimensions of respective openings formed in the semi-hollow cap member that receive the non-tapered center flange therein, such that an interference is formed between the base member and the cap member upon positioning of the cap member onto the base member, so as to secure the cap member to the base member;

wherein the center flange of the base member further comprises:

a pair of side portions positioned on opposing ends of the center flange, each of the pair of side portions having a planar top surface forming part of the upper ridge; and a center portion located between the side portions and including a top surface forming part of the upper ridge, the top surface of the center portion comprising a V-shaped notch that extends downward from the planar top surface of the side portions; and wherein the base member further comprises a pyramidal protrusion extending upward from the bottom portion partially up along a height of the center flange, the pyramidal protrusion being bisected by the center flange and having an upper point being generally aligned with the V-shaped notch of the center portion.

9. The compactor cleat of claim 8 wherein the cap member is configured to abut the pyramidal protrusion of the base member, and wherein a combination of the cap member and the pyramidal protrusion generally divides the compactor cleat into four quadrants, with each of the quadrants being angled away from other respective protrusion quadrants such that forcing the cleat into a malleable material causes the malleable material to diversify along the four quadrants.

* * * * *